United States Patent
Regensburger et al.

(10) Patent No.: US 8,651,735 B2
(45) Date of Patent: Feb. 18, 2014

(54) SENSOR ARRANGEMENT FOR DETERMINING AN INSIDE TEMPERATURE IN A MOTOR VEHICLE

(75) Inventors: Johann Regensburger, Dollnstein (DE); Georg Bauer, Bad Bocklet (DE); Andreas Kramlich, Schweinfurt (DE); Michael Reiser, Coberg (DE); Claudia Guck, Mittelstreu (DE)

(73) Assignee: Preh GmbH (DE)

( * ) Notice: Subject to any disclaimer, the term of this patent is extended or adjusted under 35 U.S.C. 154(b) by 336 days.

(21) Appl. No.: 12/677,164

(22) PCT Filed: Sep. 12, 2008

(86) PCT No.: PCT/EP2008/007505
§ 371 (c)(1),
(2), (4) Date: Jun. 9, 2010

(87) PCT Pub. No.: WO2009/033698
PCT Pub. Date: Mar. 19, 2009

(65) Prior Publication Data
US 2011/0128991 A1    Jun. 2, 2011

(30) Foreign Application Priority Data
Sep. 12, 2007 (DE) .......................... 10 2007 043 424

(51) Int. Cl.
*G01K 1/08* (2006.01)

(52) U.S. Cl.
USPC .............. 374/141; 374/208; 374/137; 374/29

(58) Field of Classification Search
USPC ........ 374/208, E1.01, 120, 121, 152, 170, 29, 374/137, 141
See application file for complete search history.

(56) References Cited

U.S. PATENT DOCUMENTS

| | | | | |
|---|---|---|---|---|
| 5,438,877 | A * | 8/1995 | Vowles et al. ................... | 73/756 |
| 6,709,155 | B2 * | 3/2004 | Knittel et al. .................. | 374/141 |
| 6,997,605 | B2 * | 2/2006 | Trapp et al. .................... | 374/172 |
| 2006/0074586 | A1 * | 4/2006 | Kautz et al. .................... | 702/130 |

FOREIGN PATENT DOCUMENTS

| | | | |
|---|---|---|---|
| DE | 4130063 | * | 3/1993 |
| DE | 19728803 C1 | | 8/1999 |
| DE | 10251128 | * | 2/2004 |

(Continued)

OTHER PUBLICATIONS

Bejan, A., Kraus, A.D., Heat Transfer Handbook 2003, John Wiley & Sons, Inc., pp. 164-165.*

(Continued)

*Primary Examiner* — Lisa Caputo
*Assistant Examiner* — Janice M Soto
(74) *Attorney, Agent, or Firm* — Cantor Colburn LLP

(57) ABSTRACT

A sensor arrangement for determining an inside temperature in a motor vehicle having a climate control device and at least a panel is at least a part of a control part of the climate control device, where the sensor arrangement includes a housing with at least a front wall and a rear wall, the housing is filled with a heat-insulating material, a first temperature sensor attached to a rear of the front wall and a second temperature sensor attached to an inner side of the rear wall, said inner side facing a rear of the front wall, and where the front wall is a part of the panel of the motor vehicle.

11 Claims, 1 Drawing Sheet

(56) References Cited

FOREIGN PATENT DOCUMENTS

| | | |
|---|---|---|
| DE | 10251128 B3 | 2/2004 |
| DE | 102004059730 A1 | 10/2005 |
| DE | 10049979 | 12/2005 |
| DE | 102007009672 A1 | 10/2007 |
| DE | 102007015231 A1 | 10/2008 |
| EP | 1415829 B1 | 5/2004 |
| EP | 1457365 A2 | 9/2004 |
| EP | 1894757 A1 | 3/2008 |
| WO | 2007115652 A1 | 10/2007 |
| WO | 2009033698 | 3/2009 |

OTHER PUBLICATIONS

International Search Report PCT/EP2008/007505; Dated Feb. 3, 2009.

* cited by examiner

SENSOR ARRANGEMENT FOR DETERMINING AN INSIDE TEMPERATURE IN A MOTOR VEHICLE

TECHNICAL FIELD

The invention relates to a sensor arrangement for determining an inside temperature in a motor vehicle which is at least a part of a climate control part, including a housing with at least a front wall and a rear wall, wherein the housing is filled with a heat-insulating material, a first temperature sensor attached to a rear of the front wall and a second temperature sensor attached to an inner side of the rear wall, said inner side facing the rear of the front wall.

BACKGROUND

Controlled air-conditioning systems are being used in motor vehicles for maintaining a pre-settable temperature. Various sensors are used for detecting the actual value of the inside temperature. The sensors are frequently integrated into the climate control devices of the motor vehicles in order to form a self-contained unit. In order to obtain the actual value, different influences on a sensor arrangement for detecting the actual temperature have to be taken into account. For example, in particular direct insolation can distort the measured value, which in turn leads to an insufficient control of the inside temperature. Apart from insolation, air circulation, the temperature of peripheral devices, as well as the body temperature of the operator are to be taken into account for instance, and are to be eliminated from the measured value for detecting the inside temperature.

A sensor arrangement for the detection of the actual room temperature is disclosed in EP 1 415 829 B1. What is described is a sensor arrangement for the determination of the inside temperature, wherein the sensor arrangement is attached on an outer side of a climate control part of an air-conditioning system. The sensor arrangement comprises a temperature sensor attached to a rear of a front wall of the sensor arrangement with a good thermal contact to the front wall. On its rear, the sensor body is sealed towards the inside of the control part by a trough-shaped plastic housing.

A sensor arrangement for the determination of an inside temperature in a motor vehicle is known from the unpublished German patent application DE 10 2007 009 672. The sensor arrangement is part of an air-conditioning system, in particular of a climate control device, consisting of a sealed housing with a front wall and a rear wall and two temperature sensors disposed opposite from each other. In this case, a first sensor attached behind a thermally conductive front wall detects the temperature of the inside of the motor vehicle, and a second temperature sensor attached in the rear part of the sensor arrangement measures the rear heat radiation onto the sensor arrangement. In order for the two temperature sensors to work independently from each other, a heat-insulating material is inserted between the sensors, into the inside of the housing of the sensor arrangement. It is thereby ensured that heat sources acting on the temperature sensors can be evaluated independently from each other. The temperature sensor facing the operator, which is attached behind the front wall, is attached to a front wall provided with good thermal conductivity. For integration into the climate control part, it is known to paint the surface of the front wall.

BRIEF SUMMARY

The disclosure provides a sensor arrangement which has a structurally simple configuration, which can be realized in an inexpensive manner, and which can be installed in the vehicle independent from the position of the climate control device.

This is achieved by the front wall of the sensor arrangement being a part of a panel in the motor vehicle, wherein the front wall has such a wall thickness that heat transfer through the front wall is ensured. The structure according to the invention of a sensor arrangement has now created the possibility of attaching the sensor arrangement at any position within the climate control part, but also at any other position, such as, for example, in the dashboard, the center console or the coverings. Disposing the sensor behind a panel creates an opportunity of adapting the panel to the interior of the motor vehicle and thus to install the sensor arrangement at any position and, advantageously, also beyond the heat radiation of peripheral devices into the motor vehicle. In contrast to the prior art, the arrangement is not restricted to geometric and/or design-related and/or aesthetic positions in the climate control part, so that a greater latitude is provided for designing the climate control part. On the one hand, this has an effect on the design-related arrangement within the climate control part, as well as on the possibility of disposing the sensor arrangement at a position in the motor vehicle that is optimal for the measurement.

Thus, this provides the advantage that the position in the motor vehicle which is suitable for an optimum measurement of the inside temperature can be used for measuring the inside temperature. It is conceivable, for example, that, for operating reasons, the climate control device is disposed such that it is exposed to a direct insolation. This results in an advantage that is essential in the invention, namely that the sensor arrangement can be shifted into an area that is not subjected to direct insolation.

Another advantage results from the fact that a reduced number of components can be employed. Where the sensor arrangement in accordance with the prior art are dependent upon the front walls composed of a good thermal conductivity are disposed as independently as possible from the interior, such as the panel or the dashboard, the sensor arrangement according to the invention can be produced with considerably less effort, because a separate freely suspended front wall is omitted, which in turn has a beneficial effect on the production costs.

Another advantage results in that dividing the components of the climate control device, of which the sensor arrangement is a part, is made easier. Now, the sensor arrangement is not bound anymore to any design parameters, but can be installed in a location in the climate control part which, depending on other components of the climate control part, offers options for an arrangement. These advantages relating to the constructional space are in turn advantageous in construction, so that a positive effect with regard to the production costs also becomes evident in this respect.

The invention will be explained in more detail below with reference to the prior art and to an exemplary embodiment.

DETAILED DESCRIPTION

Figure 1:
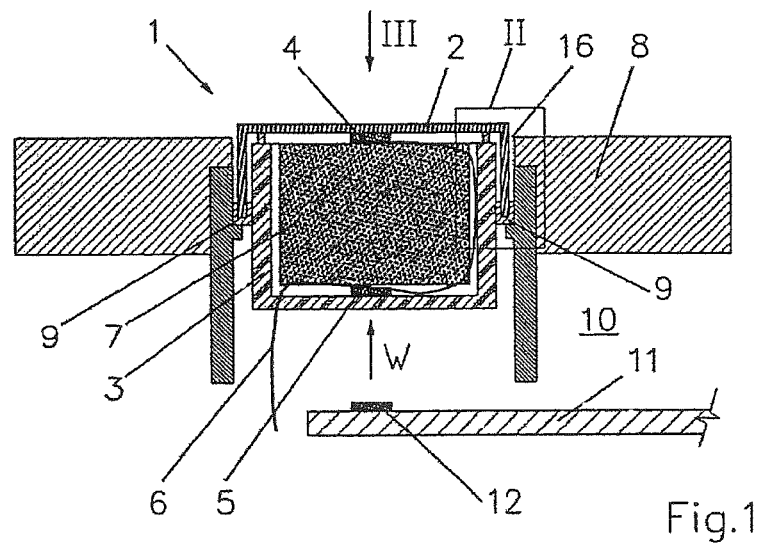
FIG. 1 shows a section through the climate control device or an instrument panel in a motor vehicle through a sensor arrangement.

FIG. 1 shows a sensor arrangement 1 according to DE 10 2007 009 672 as a surface sensor 1, comprising a front wall 2 which is part of the housing of the surface sensor 1, a rear wall 3 primarily fabricated from plastic as a rear housing part, a first temperature sensor 4 and a second temperature sensor 5, a flexible line 6, wherein the flexible line 6 is connected to the two temperature sensors 4, 5, and a heat-insulating material 7 located within the housing 2, 3, which on the one hand fills the housing 2, 3 and on the other hand provides an insulating effect between the temperature sensors 4, 5. The surface sensor 1 is integrated flush or almost flush with a panel 8 of the control device of an air-conditioning system. The sensor arrangement 1 is retained in the panel 8 by means of guide ribs 9. A circuit board 11 is shown behind the surface sensor 1 on the inside of the climate control device. Another temperature sensor 12 is attached to the circuit board 11. Direct reference is made to this generic prior art, with reference being made to the fact that the disclosure of the prior art includes the disclosure of the invention.

Figure 2:
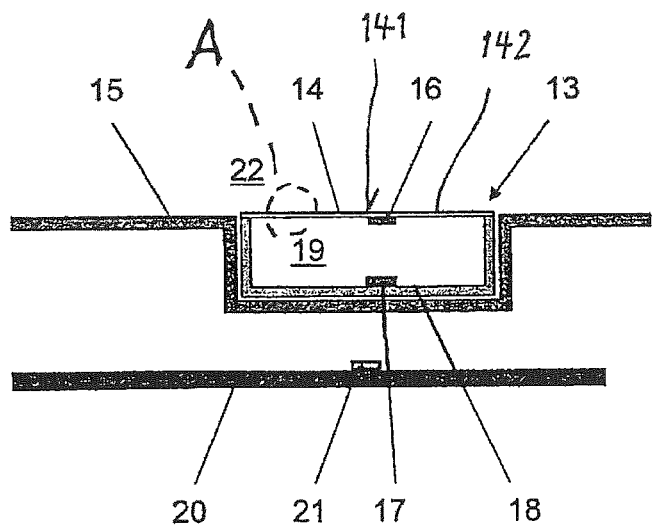
FIG. 2 shows a section through a sensor arrangement configured according to the invention.
Figure 3:
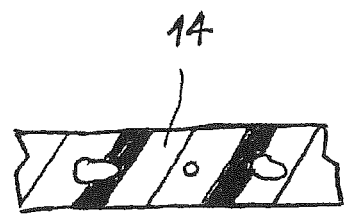
FIG. 3 shows an enlarged view of the encircled area A of FIG. 2.

Based on this prior art, the sensor arrangement 13, according to the invention, comprises a front wall 14 corresponding to a part of a panel 15 of the interior of the motor vehicle. In this case, the front wall 14, as a part of the panel 15, is also made from plastic. For example, the front wall 14 can be formed as a plastic sheet in order to ensure a good heat transfer through the front wall 14. A sensor arrangement 13 configured according to the invention is shown in FIG. 2. The sensor arrangement 13 comprises a first temperature sensor 16 attached to a rear of a front wall 14. Another temperature sensor 17 is disposed inside on a side of the rear wall 18, said side facing the front wall. A heat-insulating material can be introduced into the inside 19 of the sensor arrangement 13. The panel 15 in this example encloses the sensor arrangement 13 in a positive fit. A circuit board 20 into which another temperature sensor 21 as an environment sensor 21 is integrated is disposed behind the sensor arrangement 13. In this case, the environment sensor 21 measures the heat radiation emitted by the circuit board 20 and/or peripheral components, as well as the heating of the circuit board 20. The temperature detected by means of the environment sensor 21 in this case serves as a measured value for an energy balance model for calculating the inside temperature. The temperature sensors 16, 17, 21 are primarily NTC resistors.

In the case of disturbances, for example, sunshine, a finger on the sensor arrangement 13, the measured value can be subjected to a plausibility check by a comparison with an energy balance and a corresponding logic system, and if required, the theoretically calculated temperature can alternatively used as a basis for the actual temperature value for climate control. In the process, the energy balance model calculates the inside temperature from all necessary sensor and operational values available in the control device and in the on-board network of the vehicle. Such operational values are, for example, the external temperature, the outlet temperature from the venting ports, the air distribution, the amount of air, a solar sensor etc.

A substantial advantage of the invention results if the front wall 14 is formed integrally with the panel 15. It is then possible to integrate the sensor arrangement 13 in any way in the climate control device, in the panel or in the interior of the motor vehicle. The sensor surface 141 is configured to be thermally insulated towards the surrounding structure, but is designed to have good thermal conductivity to the inside 22 of the vehicle. It can be designed in the form of a thin plastic sheet 14. According to the invention, it is in this case also conceivable to configure the plastic to be thermally conductive at least in the area of the temperature sensor 16. This can be carried out, for example, by partially heat-conducting particles from aluminum or copper being introduced into the plastic of the front wall 14. A plastic which is preferably used is polycarbonate (PC) and Polymethylmetacrylate (PMMA). In this case, the wall thickness in the area of the temperature sensor 16 towards the inside of the motor vehicle is approximately 0.6 mm, wherein a wall thickness of the front wall 14 can be selected to lie between 0.2 mm and 2 mm, preferably between 0.4 mm and 1.2 mm, and more preferably between 0.6 mm and 0.8 mm.

The invention claimed is:

1. A sensor arrangement for determining an inside temperature in a motor vehicle having a climate control device and at least a panel, the sensor arrangement being at least a part of a control part of the climate control device, the sensor arrangement comprising:
   a closed housing with at least a front wall, side walls and a rear wall of a rear housing part fabricated from plastic and defining an inner space, the housing is filled with a non-gaseous heat-insulating material,
   a first temperature sensor attached to a rear of the front wall and
   a second temperature sensor attached to an inner side of the rear wall, said inner side facing a rear of the front wall,
   wherein the panel comprises a recessed space, the housing being arranged in the recessed space, the front wall is substantially flush with the panel outside of the recessed space, and the material of the front wall, at least in the area of the first temperature sensor, contains an additive arranged inside the front wall and incorporated into the front wall, the additive supporting heat conduction through the front wall.

2. The sensor arrangement according to claim 1, wherein the panel is a panel of the climate control device.

3. The sensor arrangement according to claim 2, wherein the panel, in the area of the sensor arrangement, has a surface corresponding to a surface of the climate control device.

4. The sensor arrangement according to claim 1, wherein the front wall is made from at least one of a thermoplastic material, PC and PMMA.

5. The sensor arrangement according to claim 1, wherein at least one additional sensor is provided, the at least one additional sensor is arranged behind the rear wall of the housing of the sensor arrangement, the additional sensor detecting a heat radiation impinging on the housing.

6. The sensor arrangement according to claim 5, wherein a circuit board is provided and is attached inside the climate control part and, at least in some areas, behind the sensor arrangement, and the additional temperature sensor is attached to the circuit board.

7. The sensor arrangement according to claim 1, wherein the front wall has a wall thickness, and heat transfer through the wall thickness is ensured.

8. The sensor arrangement according to claim 1, wherein the rear wall is arranged behind the panel outside of the recessed space.

9. The sensor arrangement according to claim 1, wherein a gap is provided between the recessed space and the side walls and the rear wall of the housing.

10. The sensor arrangement according to claim 1, wherein the first temperature sensor is integrated flush with the panel outside of the recessed space.

11. The sensor arrangement according to claim 1, wherein the front wall is made of plastic and the additive supporting heat conduction comprises particles from aluminium or copper being introduced into the plastic of the front wall.

\* \* \* \* \*